Figure 1:
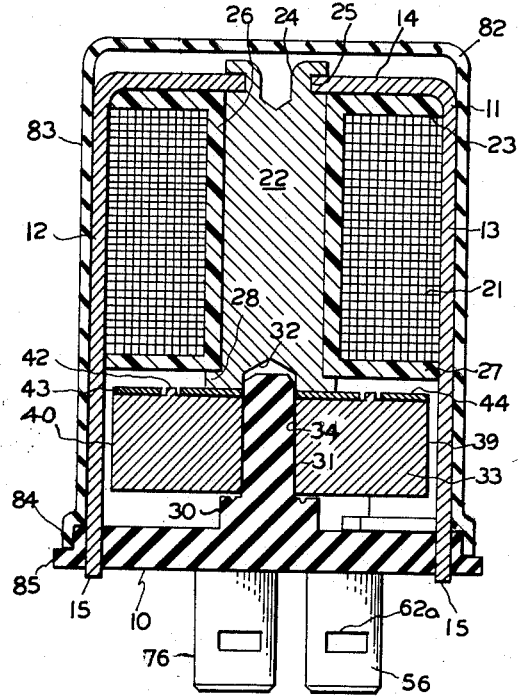

INVENTOR
ROBERT E. PROUTY

BY Robert D. Sommer

AGENT

July 19, 1966 R. E. PROUTY 3,261,943
ELECTROMAGNETIC RELAY
Filed April 7, 1965
2 Sheets-Sheet 2

INVENTOR
ROBERT E. PROUTY

BY Robert D. Sommer
AGENT

United States Patent Office 3,261,943
Patented July 19, 1966

3,261,943
ELECTROMAGNETIC RELAY
Robert E. Prouty, Logansport, Ind., assignor to Essex Wire Corporation, Fort Wayne, Ind., a corporation of Michigan
Filed Apr. 7, 1965, Ser. No. 446,153
5 Claims. (Cl. 200—87)

This invention relates to electromagnetic relays and more particularly to small, inexpensive electromagnetic relays for starting single phase induction motors having a main winding and a starting winding.

The starting of single phase induction motors is commonly controlled by electromagnetic relays which respond to variations in current or voltage of the motor windings to deenergize the motor starting winding when the motor reaches its normal running speed. One well known type of motor starting relay has a current-responsive coil connected in series with the main motor winding and normally open contacts connected in series with the starting winding. When voltage is applied to the motor, the initial inrush current through the main winding and the relay coil causes the relay to "pick up" or close the relay contacts. The resulting current flow through the starting winding causes the motor to start. As the motor speed increases, the current flow in the main winding of the motor and the relay coil decreases until the relay "drops out" or reopens the relay contacts. The motor then operates with only its main winding energized. It will be apparent that such motor starting relays must be precisely adjusted with respect to the "pick up" and "drop out" current values determined by the characteristics of the motor with which it is used.

The electromagnetic relay of this invention has particular utility as a motor starting relay, although it will be appreciated that its utility is not limited to such use. The particular relay illustrated and described herein has a maximum diameter of ⅞ inch and an overall length of only 1 and ¼ inch including its terminals and thus may be readily mounted within the housing of the motor with which it is used. The small volume and weight of the relay permit it to be mounted on a motor simply by insertion of its terminals in a suitable connector attached to the motor.

It is, therefore, an object of this invention to provide an improved miniature relay which can be mounted directly on or within an electric motor for controlling the starting winding of the motor.

Another object of this invention is to provide an electromagnetic relay of the foregoing type which can be inexpensively and accurately manufactured and calibrated so that it will operate to perform its desired function, and one which is small in size and weight, and durable in use and construction.

With these and other objects in mind, the improved relay construction of this invention comprises, in brief, a substantially U-shaped frame having its legs secured to a base of insulating material and having a core carrying a coil attached to its bight portion. A balanced armature is pivotally mounted between the core and the base so that the armature ends are attracted to the frame legs when the coil is energized. A bridging contact carried by the armature has a pair of resilient contact arms extending in opposite directions on opposite sides of the armature. The free end of one contact arm engages a first stationary contact on the base so that the contact arm normally biases the armature ends away from the frame legs. The free end of the other contact arm is normally separated from a second stationary contact on the base but engages the second contact with a flexing or wiping action when the armature is attracted to the frame legs. Adjusting screws for each stationary contact permit adjustment of the relay "pick up" and "drop out" values.

Figure 2:
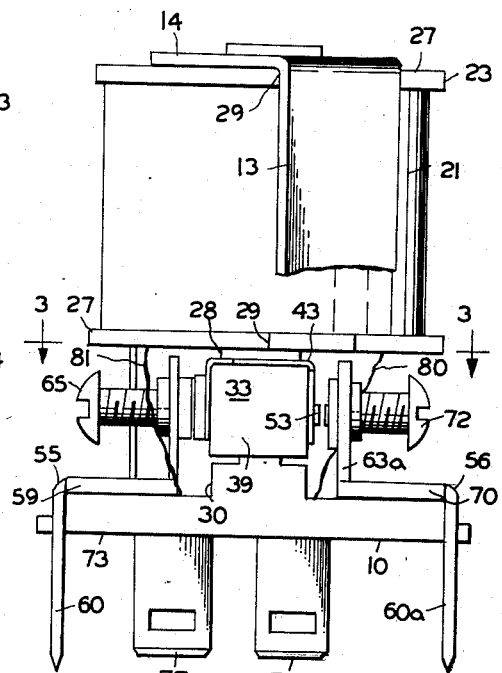
Figure 4:
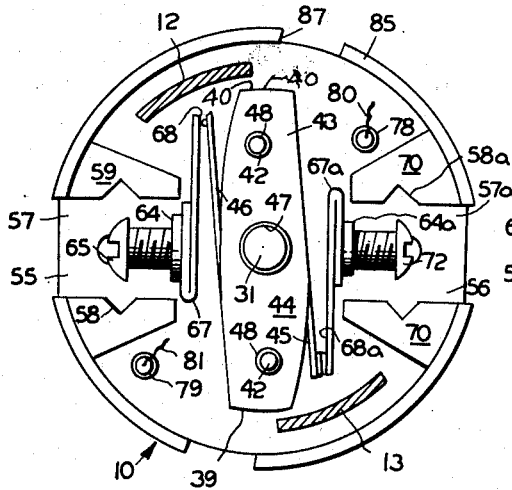
Figure 3:
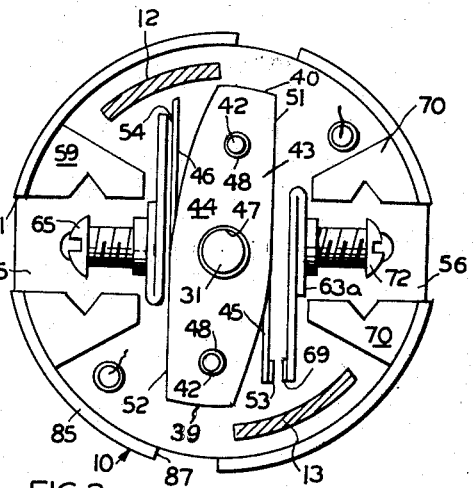
Figure 5:
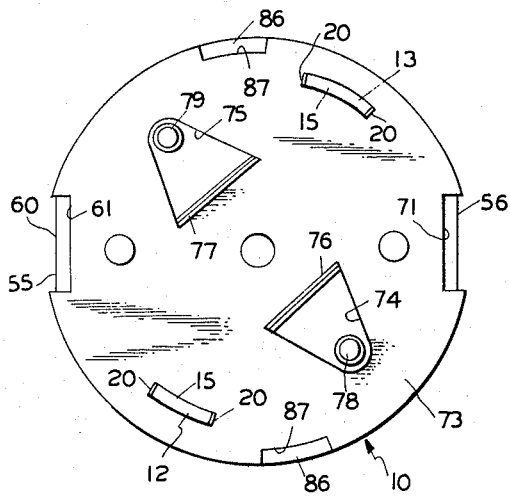
Figure 6:
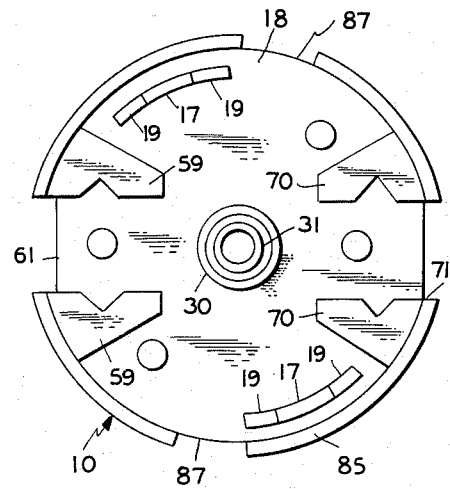
Figure 7:
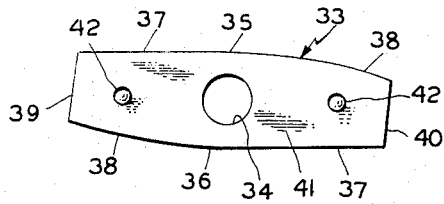
Figure 8:
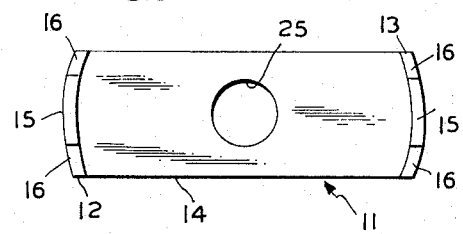
Figure 9:
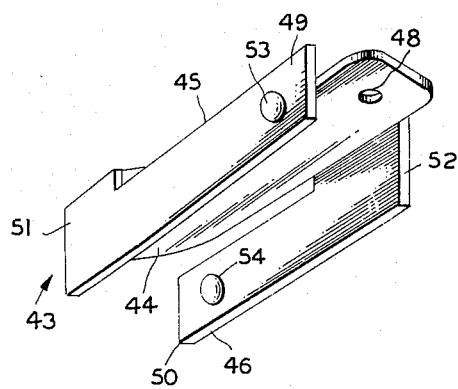
Figure 10:
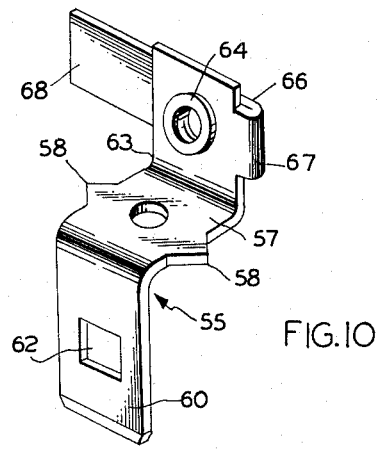

Other features and advantages of the invention will be apparent from the following description and the accompanying drawings in which:

FIGURE 1 is a vertical cross-sectional view of the electromagnetic relay of the present invention;
FIGURE 2 is a side elevation of the relay with a portion of the frame broken away, the case having been removed;
FIGURE 3 is a sectional view on line 3—3 of FIGURE 2;
FIGURE 4 is a view similar of FIGURE 3 showing the armature in another position;
FIGURE 5 is a bottom plan view of the relay;
FIGURE 6 is a plan view of the inner side of the relay base;
FIGURE 7 is a plan view of the armature of the relay;
FIGURE 8 is a bottom view of the frame of the relay;
FIGURE 9 is a perspective view of the spring contact member of the relay; and
FIGURE 10 is a perspective view of a contact terminal of the relay.

Referring to the drawing, there is shown a relay of the electromagnetic type having a disc-like base 10 of molded insulating material. Mounted upon the base 10 is a generally U-shaped magnetic frame 11 having a pair of arcuate leg portions 12 and 13 extending at right angles to a flat bight or end portion 14. The free ends of the leg portions 12 and 13 each terminate in a tab portion 15 extending from between a pair of shoulders 16. The base 10 has a pair of arcuate anchoring slots 17 which are enlarged adjacent the inner surface 18 of the base 10 to provide the recesses 19. The ends of the frame leg portions 12 and 13 fit snugly in their respective slots 17 with the tab portions 15 extending through the slots 17 and the shoulders 16 received in the recesses 19. The free ends of the tab portions 15 are staked as indicated at 20 for fixedly securing the frame 11 to the base 10. As the shoulders 16 of the frame 10 engage the bottom of the recesses 19 at a fixed distance from the plane of the inner surface 18 of the base 10, the frame end portion 14 is supported in a predetermined position with respect to the surface 18.

An electromagnet comprising a coil 21 surrounding a cyclindrical core 22 of magnetic material is secured to the end portion 14 of the frame 11. The coil 21 is wound on a bobbin 23 molded of suitable insulating material such as nylon resin and has a hollow cylindrical body 26 and two end flanges 27. The core 22 extends through the bobbin body 26 and has an end portion 24 of reduced cross-section which projects through a centrally-located opening 25 in the end portion 14 of the frame 11. The end portion 24 is peened over to firmly secure the core 22 to the frame 11. The free end of the core 22 is defined by a flange 28 which serves to hold the bobbin 23 in place between the flange 28 and the end portion 14 of the frame 11. The bobbin flanges 27 may each be formed with a pair of shallow notches 29 in which are received the frame leg portions 12 and 13 to prevent undesirable rotary movement of the bobbin 23 about the core 22.

Centrally located upon the inner surface 18 of the base 10 is a cylindrical boss 30 from which axially extends a pivot pin 31. The free end of the pivot pin 31 is received in a bore 32 of the core 22. Rotatably mounted upon the pivot pin 31 between the boss 30 and the core flange 28 is a balanced armature 33 provided with a central circular opening 34 by which the armature is journalled for rotation on the pin 31. The armature 33 which may be formed of sintered iron powder plated with tin is generally rectangular in shape and has two sides 35 and 36 each including a flat surface 37 and a curved surface 38. The ends 39 and 40 of the armature 33 are of arcuate configuration, the arc of each end being concentric with the arcs of the frame leg portions 12 and 13. Protruding from the face 41 of the armature 33 is a pair of spaced positioning projections 42.

Mounted upon the armature 33 is a spring contact member 43 which is formed from a thin-gauge sheet of non-magnetic spring metal, preferably a beryllium-copper alloy. The spring contact member 43 comprises a flat central portion 44 with a pair of contact arms 45 and 46. The central portion 44 which has a configuration similar to that of the armature face 41 is provided with a central aperture 47 for the passage of the pivot pin 31 and a pair of openings 48 for receiving the projections 42 when the central portion 44 is positioned on the armature face 41. The contact arms 45 and 46 each have a flat free end 49 and 50, respectively, and a fixed flat end 51 and 52, respectively. The fixed ends 51 and 52 are bent at right angles with respect to the central portion 44 so as to lie adjacent the respective flat surfaces 37 of the armature sides 35 and 36. The free end 49 of the contact arm 45 extends in the same plane as that of the fixed end 51 but the free end 50 is slightly bent away from the armature side 36 to lie in a plane displaced approximately seven degrees from that of the fixed end 52. The free end 49 of the contact arm 45 carries an electrical contact 53 of silver or other suitable material. The free end 50 of the contact arm 46 is formed with a dimpled portion providing a protruding electrical contact 54.

The armature 33 and the spring contact member 43 are disposed between two stationary contact terminals 55 and 56 which are bridged by the spring contact member 43 when the armature 33 is in the position shown in FIGURE 4. The terminals 55 and 56 are preferably formed from half hard brass stock of approximately 0.02 inch thickness. The terminal 55 as shown in FIGURE 10 includes a flat anchoring portion 57 having side edges formed with lugs 58 to fit snugly in a channel provided by a pair of bosses 59 on the inner surface 18 of the base 10. The anchoring portion 57 is suitably riveted in fixed position on the base 10. Extending perpendicularly from one end of the anchoring portion 57 is a flat blade portion 60 which passes through a notch 61 formed in the peripheral edge of the base 10. The blade portion 60 which is provided with a detent hold 62 may receive a conventional receptacle terminal of the type disclosed in United States Patent No. 2,600,190 issued June 10, 1952 to Hugh W. Batcheller. A supporting bracket portion 63 extends perpendicularly from the other end of the anchoring portion 57 in a direction away from the base 10. The bracket portion 63 is formed with an extruded hole 64 which is internally threaded to receive an adjusting screw 65. The bracket portion 63 has a lateral extension 66 which is bent back upon itself at a short distance from the bracket portion 63 as shown at 67. A portion of this extension 66 thus is folded up against the bracket portion 63 to overlie the threaded hole 64. The surface 68 of the free end of the extension 66 is positioned for engagement by the dimpled portion 54 of the contact arm 46 and therefore functions as a stationary contact.

The contact terminal 56 is identical to the contact terminal 55 except that it includes an electrical contact 69 positioned for engagement by the contact 53 on the contact arm 45 of the spring contact member 43. The parts of the contact terminal 56 have therefore been identified by the reference numerals applied to the corresponding parts of the contact terminal 55 with a suffix "a" added. The anchoring portion 57a of the terminal 56 is disposed between the bosses 70 on the inner surface 18 of the base 10 and suitably riveted to the base 10. The contact terminal 56 has a blade portion 60a passing through a notch 71 in the peripheral edge of the base 10 directly opposite the notch 61. An adjusting screw 72 is received in the threaded hole 64a of the bracket portion 63a. The contact 69 may be formed by any suitable contact material such as silver and is suitably secured to the surface 68a of the extension 66a.

The outer surface 73 of the base 10 is provided with generally triangular recesses 74 and 75 to receive and position the terminals 76 and 77, respectively. Eyelets or hollow rivets 78 and 79 extend through the base 10 and the respective terminals 76 and 77 and are spun over against the terminals to fasten the terminals to the base. The two leadwires 80 and 81 of the coil 21 have their ends extending into the respective eyelets 78 and 79 and soldered or welded in electrical connection thereto.

The relay structure thus far described may be enclosed after assembly and adjustment by a cup-shaped cover 82 of nylon or other suitable insulating material. The smaller diameter portion 83 of the cover 82 fits snugly about the frame leg portions 12 and 13. An enlarged cylindrical portion 84 at the open end of the cover 82 fits snugly about the base 10 and rests upon a flange 85 around the periphery of the base 10. The cover 82 is retained on the base 10 by tabs 86 which pass through slots 87 in the flange 85 and are bent over the outer surface 73 of the base 10 by the application of heat and pressure.

The operation of the relay may be briefly described as follows: The parts of the relay normally are in the positions shown in FIGURE 3 when the coil is not energized, the armature being urged to this position by the biasing force of the contact arm 46 of the spring contact member 43 against the extension 66 of the contact terminal 55. In this position, the arcuate ends 39 and 40 of the armature 33 each have a small portion lying within the arc subtended by the respective leg portions 12 and 13 of the frame 11. It will also be noted that the contact 53 on the contact arm 46 of the spring contact member 43 is separated from the fixed contact 69 on the extension 66a of the contact terminal 56.

When the coil 21 is energized by the initial inrush current to the main winding of a motor being started, this heavy current produces a large magnetic flux through the core 22 which divides between the two arms of the armature 33 and flows across the air gaps between the armature ends 39 and 40 to the respective leg portions 12 and 13 of the frame 11. The ends of the armature 33 are drawn toward the frame leg portions causing the armature 33 to rotate on the pivot pin 31 in a counterclockwise direction as viewed in FIGURE 3. After the contact 53 engages the contact 69, the armature 33 travels an additional distance against the resilient force of the contact arm 45 to the position shown in FIGURE 4. This additional travel taken up in the deflection of the contact arm 45 provides a wiping action between the contacts 53 and 69 which keeps the contacts clean.

When the motor comes up to speed, the current in the coil 21 drops causing a reduction in the magnetic flux flowing through the armature 33. The reduction in the magnetic attracting force acting on the armature 33 allows the armature to be returned by the resilient force of the contact arm 46 to the position shown in FIGURE 3. During the return of the armature 33, the contacts 53 and 69 separate to interrupt the starting winding circuit of the motor.

To calibrate the relay for specified "pick up" and "drop out" values, the adjusting screws 65 and 72 are turned in their respective threaded openings to bear against the respective extensions 66 and 66a. The end of the screw 65 engages the extension 66 at a point that is spaced from the bend 67. Thus as the screw 65 is moved against the extension 66, the extension 66 is displaced away from the bracket portion 63 causing the free end of the extension 66 to move toward the armature 33. It will, of course, be clear that the initial relative positions of the armature 33 and the frame leg portions 12 and 13 is a controlling factor in the current value required to attract or "pick up" the armature 33. The "pick up" value thus may be adjusted by turning the screw 65 to bend the extension 66. The more the extension 66 is bent away from the bracket portion 63, the more the initial overlap of the frame leg portions 12 and 13 with the armature 33 is reduced. Similarly, the adjustment of the extension 66a by the screw 72 provides control over the point that contacts 53 and 69 separate during a decrease in current flow through the coil 21 for setting the relay "drop out" value.

From the foregoing, it will be appreciated that the novel arrangement of the relay is extremely compact and uses a minimum of parts which are inexpensive to fabricate although constructed for easy and accurate assembly. The relay, while extremely small, is easily adjustable from its sides. It will further be seen that the relay may be plugged into a socket connector.

It will be obvious that the normally open contact arrangement of the relay herein described and illustrated can be readily changed to a normally closed contact arrangement. This and other modifications and adaptations may be made without departing from the scope of the invention as hereinafter claimed.

What is claimed is:
1. An electromagnetic relay comprising:
a base member of insulation material;
a substantially U-shaped magnetic frame carried by said base member, said frame having a pair of spaced leg portions extending toward and fixedly secured to said base member to space the bight portion of the frame from the base member;
a magnetic core mounted on said bight portion of the frame and extending toward said base member;
a coil on said core disposed between said leg portions of the frame;
a magnetic armature interposed between said base member and said core;
means rotatably supporting said armature on said base member so that the ends of said armature are rotatable adjacent to said leg portions of the frame;
a pair of stationary contacts carried by said base member and positioned on opposite sides of said armature;
and a bridging contact member carried by said armature and having a pair of resilient contact arms lying on opposite sides of said armature, one of said contact arms having a free end engaging one of said stationary contacts to bias said armature away from said leg portions, the other of said contact arms having a free end extending toward the other of said stationary contacts for switching action therewith.

2. An electromagnetic relay according to claim 1 including adjustable means for said one stationary contact for varying the biasing effect of said one contact arm upon said armature.

3. An electromagnetic relay comprising:
a base member of insulation material;
a substantially U-shaped frame of magnetic material carried by said base member, said frame having a pair of spaced leg portions of arcuate cross section extending toward and fixedly secured to said base member to space the bight portion of the frame from the base member;
a core of magnetic material fixedly secured to said bight portion of the frame and extending toward said base member;
a coil on said core disposed between said leg portions of the frame;
an armature of magnetic material interposed between said base member and said core;
shaft means pivotally supporting said armature on said base member for rotation on an axis which coincides with the axis of said core;
said armature having balanced arms with arcuate ends extending in opposite directions toward said leg portions, said armature being in a magnetic circuit with said core and frame so that said armature is rotated through a predetermined arc by attraction to said leg portions when said core is energized;
a pair of stationary contact supporting members carried by said base member and positioned on opposite sides of said armature;
said stationary contact supporting members each including a stationary contact facing said armature and positioned adjacent a respective one of said frame leg portions;
and a bridging contact member carried by said armature and having a pair of resilient contact arms supported in cantilever fashion on opposite sides of said armature adjacent opposite ends thereof so as to extend in opposite directions on opposite sides of said armature, one of said contact arms having its free end in engagement with one of said stationary contacts and normally biasing said armature in a direction away from said leg portions, the other of said contact arms having its free end extending toward the other of said stationary contacts for movement by said armature upon its attraction toward said leg portions into engagement with said other stationary contact and for flexing about said other stationary contact with continued movement of said armature in the same direction.

4. An electromagnetic relay according to claim 3 wherein said one stationary contact includes a lateral extension of its respective contact supporting member, and an adjusting screw threaded in said respective contact supporting member and engaging said extension for adjusting the resilient biasing force exerted on said armature by said first contact arm.

5. An electromagnetic relay according to claim 3 wherein said other stationary contact includes a lateral extension of its respective contact supporting member which is bent back upon itself to overlie its respective contact supporting member, and an adjusting screw threaded in the last said contact supporting member and engaging said extension for adjusting the separation of said other stationary contact from said other contact arm in the unattracted position of said armature.

References Cited by the Examiner
UNITED STATES PATENTS
2,256,653  10/1941  Snavely _____ 200—104 X
2,422,861  6/1947  Skrobisch _____ 200—87 X BERNARD A. GILHEANY, *Primary Examiner.*
J. J. BAKER, *Assistant Examiner.*